(12) United States Patent
Robinson (10) Patent No.: US 9,986,060 B2
(45) Date of Patent: May 29, 2018

(54) PERSISTENT CACHING OF MAP IMAGERY AND DATA

(71) Applicant: General Electric Company, Schenectady, NY (US)

(72) Inventor: Phillip James Robinson, Cambridge (GB)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 14/673,330

(22) Filed: Mar. 30, 2015

(65) Prior Publication Data
US 2016/0294970 A1 Oct. 6, 2016

(51) Int. Cl.
| G06F 15/16 | (2006.01) |
| H04L 29/08 | (2006.01) |
| H04L 29/06 | (2006.01) |
| G06F 17/30 | (2006.01) |

(52) U.S. Cl.
CPC .... H04L 67/2842 (2013.01); G06F 17/30241 (2013.01); H04L 67/42 (2013.01)

(58) Field of Classification Search
CPC ............ H04L 67/2842; H04L 67/42; G06F 17/30241
See application file for complete search history.

(56) References Cited

U.S. PATENT DOCUMENTS

| 6,005,978 A * | 12/1999 | Garakani | G06K 9/4609 382/151 |
| 8,130,245 B2 | 3/2012 | Ham et al. | |
| 8,271,830 B2 * | 9/2012 | Erofeev | G06F 11/1456 710/53 |
| 8,369,867 B2 * | 2/2013 | Van Os | H04W 4/02 370/310.2 |
| 8,803,920 B2 * | 8/2014 | Kalai | G06T 1/60 345/660 |

(Continued)

FOREIGN PATENT DOCUMENTS

| EP | 1457893 A2 | 9/2004 |
| WO | WO2008054805 | 5/2008 |

OTHER PUBLICATIONS

Antonios Oanalis: "Web Caching" In: "Encyclopedia of Information Science and Technology", Jan. 7, 2005 (Jan. 7, 2005), p. 3050, Idea Group Reference, Hershey, Pennsylvania, USA, XP055288819, ISBN: 978-1-59140-553-5.

(Continued)

*Primary Examiner* — Moustafa M Meky
*Assistant Examiner* — Andrea Hurst
(74) *Attorney, Agent, or Firm* — Parks IP Law LLC (57) ABSTRACT

The present disclosure relates to a geographic information system (GIS) for collecting data for future usage. In operation, a spatial server receives an image request to a client device, applies a hash function to the image request to generate a standardized identifier. The GIS client device uses the standardized identifier, attributes of GIS data associated with the standardized identifier or the GIS data, or attributes of GIS data associated with a stored identifier that corresponds to the standardized identifier to determine whether to retrieve or cache a GIS data associated with the standardized or stored identifier for display on the client device.

20 Claims, 3 Drawing Sheets

(56) References Cited

U.S. PATENT DOCUMENTS

| | | | | |
|---|---|---|---|---|
| 8,805,117 | B2* | 8/2014 | Liu | G06K 9/4671 382/190 |
| 8,832,223 | B1* | 9/2014 | Kornmann | G06F 17/30241 709/201 |
| 9,047,315 | B1* | 6/2015 | Gildfind | G06F 17/3087 |
| 9,389,088 | B2* | 7/2016 | Kalai | G01C 21/32 |
| 9,442,980 | B1* | 9/2016 | Trepetin | G06F 17/30477 |
| 2011/0016153 | A1* | 1/2011 | Atta | G06F 17/30445 707/797 |
| 2011/0203003 | A1* | 8/2011 | Peeters | G06F 21/52 726/26 |
| 2012/0047223 | A1* | 2/2012 | Tarkoma | H04L 67/1097 709/217 |
| 2012/0329507 | A1* | 12/2012 | Watanabe | H04W 24/10 455/517 |
| 2013/0013729 | A1 | 1/2013 | Bennett | |
| 2013/0022280 | A1* | 1/2013 | Liu | G06K 9/4671 382/224 |
| 2013/0073581 | A1* | 3/2013 | Sandholm | G06F 17/30545 707/769 |
| 2013/0073686 | A1* | 3/2013 | Sandholm | G06Q 30/0631 709/219 |
| 2013/0173747 | A1* | 7/2013 | Kim | H04L 67/02 709/217 |
| 2015/0088413 | A1 | 3/2015 | Becker | |
| 2017/0017672 | A1* | 1/2017 | Fan | G06F 17/30902 |

OTHER PUBLICATIONS

European Search Report issued in connection with corresponding EP Application No. EP16161978.8 dated Aug. 2, 2016.

* cited by examiner

PERSISTENT CACHING OF MAP IMAGERY AND DATA

FIELD OF INVENTION

The present invention relates generally to GIS mapping systems, and more specifically to systems and methods for maintaining a persistent cache of GIS map images and other GIS data in a GIS client.

BACKGROUND OF THE INVENTION

A geographic information system (GIS) captures, stores, analyzes, and manages data and associated attributes that are spatially referenced to Earth. The GIS can integrate hardware, software, and data for presenting spatial or geographical data to an end user. The GIS can function within or in conjunction with any number of devices or applications such as servers, web-browsers, desktops, and mobile devices. The GIS may provide information about the location of items, such as buildings, streets, and utilities, among others.

A GIS can arrange millions of tiles images in a mosaic to create an illusion of a large seamless image, each tile containing an image that is, for example, 256×256 pixels. To organize the millions of tile images, a coordinate system is used whereby each tile image is identified by x and y coordinates describing tile position. A z coordinate is used to describe a zoom level. For example, a first tile image in the system has x/y/z coordinates of 0/0/0.

The GIS includes a GIS map client that can generate and transmit a request to a remote spatial server (e.g., a map server), which determines which tile images need to be retrieved and supplied to the GIS client to respond to the particular request. The GIS client downloads the tile images from the map server and renders the map by positioning the tile images on a page. Tile images may be stored in random access memory in the process of rendering the requested map.

The data transfers associated with rendering a map composed of downloaded GIS tile images can cause undesired delays and drain processor resources of the GIS, map client, or spatial server, depending on factors such as complexity of a request, communications network connectivity and power constraints of the GIS processor, among others. In addition, the requesting device or system associated with the map client may be a mobile device that experiences periods of suboptimal connectivity, e.g., due to geography or network interruptions. In such circumstances, map rendering may be slow or impossible, which negatively impacts reliability.

Various efforts have been pursued to address the constraints associated with the generating and/or rendering of tile images. For example, a map can be generated at least in part by using tile images retrieved from a cache in a local memory associated with the requesting client, where the tiles are stored as an "extract" compiled by the GIS server based on map properties such as a location or an identifier. Once the GIS server generates the extract by retrieving the necessary tile images and associated data, the extract can be transmitted to the requesting device and stored again to the cache for future retrieval. When the same tile images are needed for a future request, turnaround time is greatly reduced by retrieving the tile images from local memory, and the tile images are available regardless of the connectivity status of the requesting client. However, this approach requires substantial allocation of client-side memory resources to store the necessary tile images, and the GIS server must also maintain sufficient hardware, firmware, or software resources to prepare and transmit the extracts.

SUMMARY OF THE INVENTION

Given the aforementioned deficiencies, a need exists for systems and methods that efficiently and reliably generate GIS maps for a GIS client, while optimizing use of both local and remote resources by selectively and persistently storing data (such as tile images) within a local memory and by logically managing the local memory resources used to maintain the persistent cache. In contrast to the "extract" approach described above, the cache in non-volatile local memory is populated on demand, in that the tile images are supplied by the GIS server without extensive processing at the server level, and it is the client that determines which tile images are to be cached to reproduce particular components, for instance, of frequently-accessed maps or map sections.

The present disclosure relates to a GIS used for storing GIS map images and other associated GIS data to a memory. The system includes a computer-readable storage device comprising instructions that cause a processor to perform operations for retrieving one or more tile images (e.g., map tiles) from a spatial server and storing the tile images to a non-volatile local memory.

The tile images are retrieved from a database and compiled by a spatial server in response to an image request received by the spatial server from a client device. The image request typically includes or is in the form of an address or position coordinates, which may be translated further before being transmitted to the spatial server. The GIS server then converts the image request into a standardized image request and applies a hash function to the standardized image request to generate a standardized identifier (e.g., hash code) that identifies individual or collective GIS data (e.g., the images, asset data, asset status) that are responsive to the image request. Again, instead of creating an extract, the GIS server generates the hash code to identify the tile images that would otherwise be included in an extract.

Each standardized identifier is then communicated to the requesting GIS client, which then compares each standardized identifier to a repository of standard identifiers previously stored within a local memory associated with the GIS client ("pre-stored identifiers"). If a standardized identifier received from the spatial server is not found in the local memory, the GIS client downloads the GIS data associated with the standardized identifier from the spatial server to render the requested image. The downloaded data at least initially or partially may be stored in volatile memory.

Where, for example, GIS data, such as a tile image, is retrieved from the spatial server, the requested tile image may be then stored by the GIS client to the non-volatile local memory of the device, which generally has a predefined capacity for storage. Those skilled in the art will readily appreciate that memory resources may be flexible or virtual, in that memory can be partitioned or otherwise assigned for a particular purpose and reallocated as needed, so a predefined capacity is not necessarily fixed. Furthermore, utilization of the predefined capacity may be limited to a percentage, e.g., 95% of its physical storage space.

Before storing the tile images associated with the standardized identifier in the local memory of the client device, the GIS client assesses the capacity of the local memory to determine whether the predefined capacity for storage has been reached or would be exceeded by storing the tile image. If the local memory cannot or will not accommodate the tile images to be stored, the GIS client identifies at least one previously-stored tile image to remove (i.e., delete or overwrite) from the local memory in accordance one or more methodologies described in the present disclosure.

In some embodiments, the previously-stored tile image is to be removed from the local storage based on a time index (e.g., a time stamp) with which it was associated to specify when the previously-stored image was stored in the local memory. For example, if a previously-stored tile image has been resident in the local memory for more than X days, it may be selected for removal. As such, the GIS client may select the oldest tile image for removal, or may alternatively select the oldest tile image in a certain category.

In some embodiments, the previously-stored image is to be deleted from the local storage based on its frequency of use, which may be tracked using a frequency identifier which it has been associated to specify, for example, the number of times that the previously-stored image has been retrieved from the local memory during a defined period of time (e.g., a frequency window). For example, if a previously-stored tile image has been retrieved infrequently, perhaps being retrieved from the local memory less than Y times in the past X days, it may be selected for removal. As such, the GIS client may select the least-used tile image for removal, or may alternatively select the least-used tile image in a certain category. In these embodiments, if the frequency window has not elapsed since the previously-stored tile image was stored in the local memory, it may not be selected for removal, or the process may not evaluate a previously-stored tile image for removal until the associated time index indicates that it has been stored for at least the period of time that defines the frequency window. Version control may also be used to ensure that a cached map image or element of a map image is kept up to date, for example, when assets on the map change, or the mapped geography itself changes.

In some embodiments, when the standardized identifier that was communicated by the spatial server to the requesting GIS client is found in the repository of standard identifiers previously stored within the local memory, the GIS client determines whether to download the tile image nonetheless to ensure that the previously-stored tile images are kept up to date. For example, the previously-stored tile image may be removed if the standardized identifier of the requested tile image matches the stored identifier of the stored image and the requested tile image is newer, in terms of its creation as opposed to its storage, than the previously-stored tile image.

If a standardized identifier received from the spatial server is not found in the local memory, the GIS client downloads the GIS data associated with the standardized identifier from the spatial server to render the requested image.

In certain embodiments, the determination of whether to remove a tile image is based on a combination of any or all of the aforementioned or substantially equivalent methodologies.

In some embodiments, more than one previously-stored tile image may be removed from the local storage to provide sufficient space. In fact, the operation of determining which tile image to remove from the local storage may be repeated until sufficient space is acquired within the local storage.

In some embodiments, the GIS client determines whether to retrieve, from the local memory, previously-stored GIS data that corresponds to one or both of the standardized and the stored identifier. In doing so, the GIS client may determine whether the GIS client has sufficient connectivity to the spatial server to access GIS data. In some embodiment, the GIS client determines whether sufficient connectivity is established between the GIS client and the spatial server before transmitting the request to the spatial server.

When the GIS client is determining whether to retrieve previously-stored GIS data, the GIS client may additionally or alternately determine frequency of access of the previously-stored GIS data, age of the previously-stored GIS data, relative age of the previously-stored GIS data, duration of storage of the previously-stored GIS data in the local memory, and/or version of the previously-stored GIS data.

In some embodiments, the GIS client determines whether to cache any of the retrieved GIS data. Where the available storage capacity of the local memory is at least equal to a predefined capacity threshold, the GIS data retrieved is stored to the local memory. Where the available storage capacity of the local memory is less than a predefined capacity threshold, the retrieved GIS data replaces GIS data previously stored in the local memory. Replacement of GIS data may be based frequency of access of the previously-stored GIS data and age of the previously-stored GIS data, among others.

In some embodiments, the GIS client compares frequency data associated with the previously-stored GIS data with a predefined frequency threshold to select previously-stored GIS data for replacement with the retrieved GIS data. In some embodiments, the GIS client compares age data associated with the previously-stored GIS data to identify the oldest GIS data stored in the local memory. In some embodiments, the GIS client compares a timestamp associated with the previously-stored GIS data and with a predefined duration threshold to select previously-stored GIS data for replacement with the retrieved GIS data.

The present technology further discloses a method for retrieving one or more tile images from the spatial server and storing the tile images to the non-volatile local memory. When the predefined capacity for the local memory has been reached, the GIS determines one or more previously-stored tile images to remove from the local memory.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present invention are directed toward methods, systems, and computer servers for providing map and image services with map caching using signature (e.g., signature-based map caching) or other unique identifiers. When requesting a map with a specific set of properties, a client application can format the request into a standardized or otherwise suitable format for transmission to a map server providing signature-based map services. The client application can store the requested map to a storage of the client device for future use by the client device regardless of the state of the communications with a spatial sever through a network. Although embodiments focus on the use of caching for in map imagery services, additional embodiments can be applied to non-geographic and non-map based objects that need to be disseminated.

Figure 1:
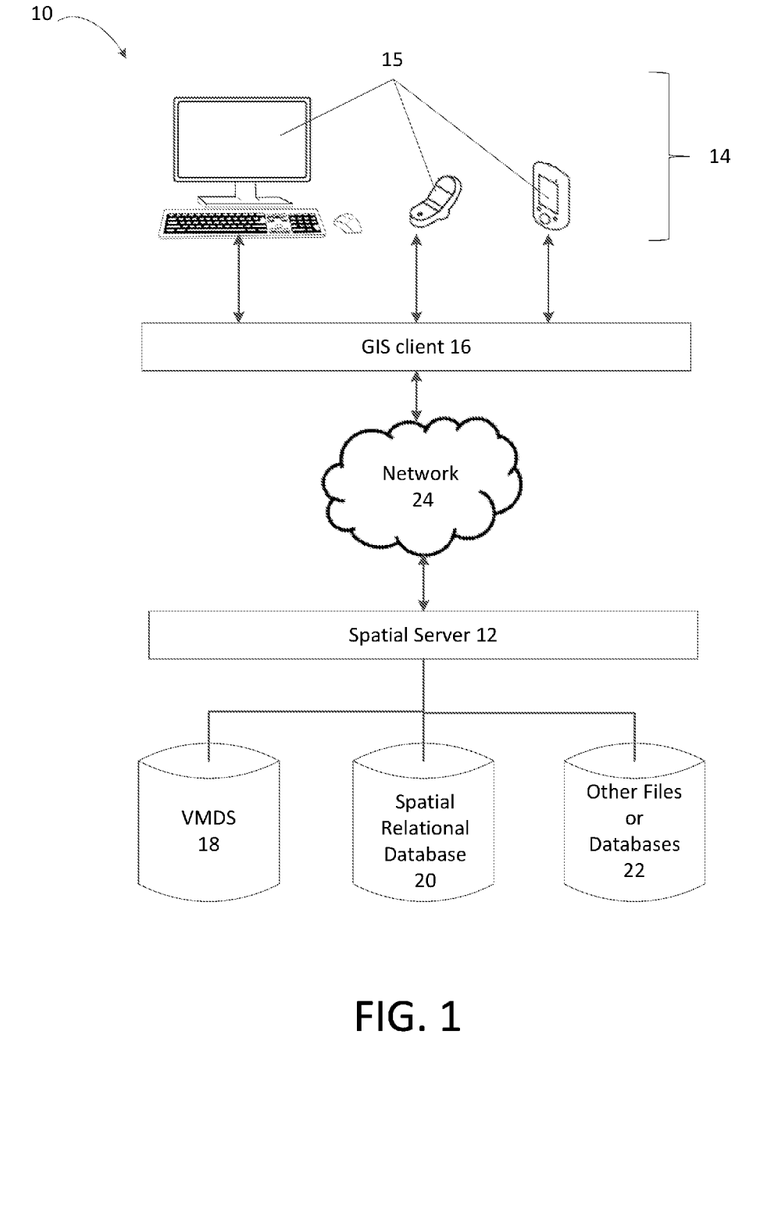
FIG. 1 is a block diagram of an exemplary embodiment of a geographic information system (GIS).

FIG. 1 is a block diagram of an embodiment of a Geographic (geospatial) Information System (GIS) 10. In the embodiment, the GIS 10 generally consists of a server 12 that may support at least one client device 14 or particular client base, which may be defined by a geographical area or cluster of client devices 14, all of which are connected by means of a communications medium such as a network 24. Most succinctly, the GIS 10 includes a plurality of client devices 14 in communication with a spatial server 12 by way of a network 24 such as the Internet.

The client devices 14 can be any device capable of connecting to other devices via the network 24, such as, but not limited to, computers, mobile devices (e.g., smart phones and tablets), servers, routers, network computers, and smart grid components, among others. Each client device 14 may include or access a display 15 or other means for providing an interface for map images and associated data. Each client device 14 contains a controller for processing and controlling functions of the client device 14, among others. The controller includes components such as, but not limited to, one or more processors and a memory, some of which is non-volatile.

Figure 2:
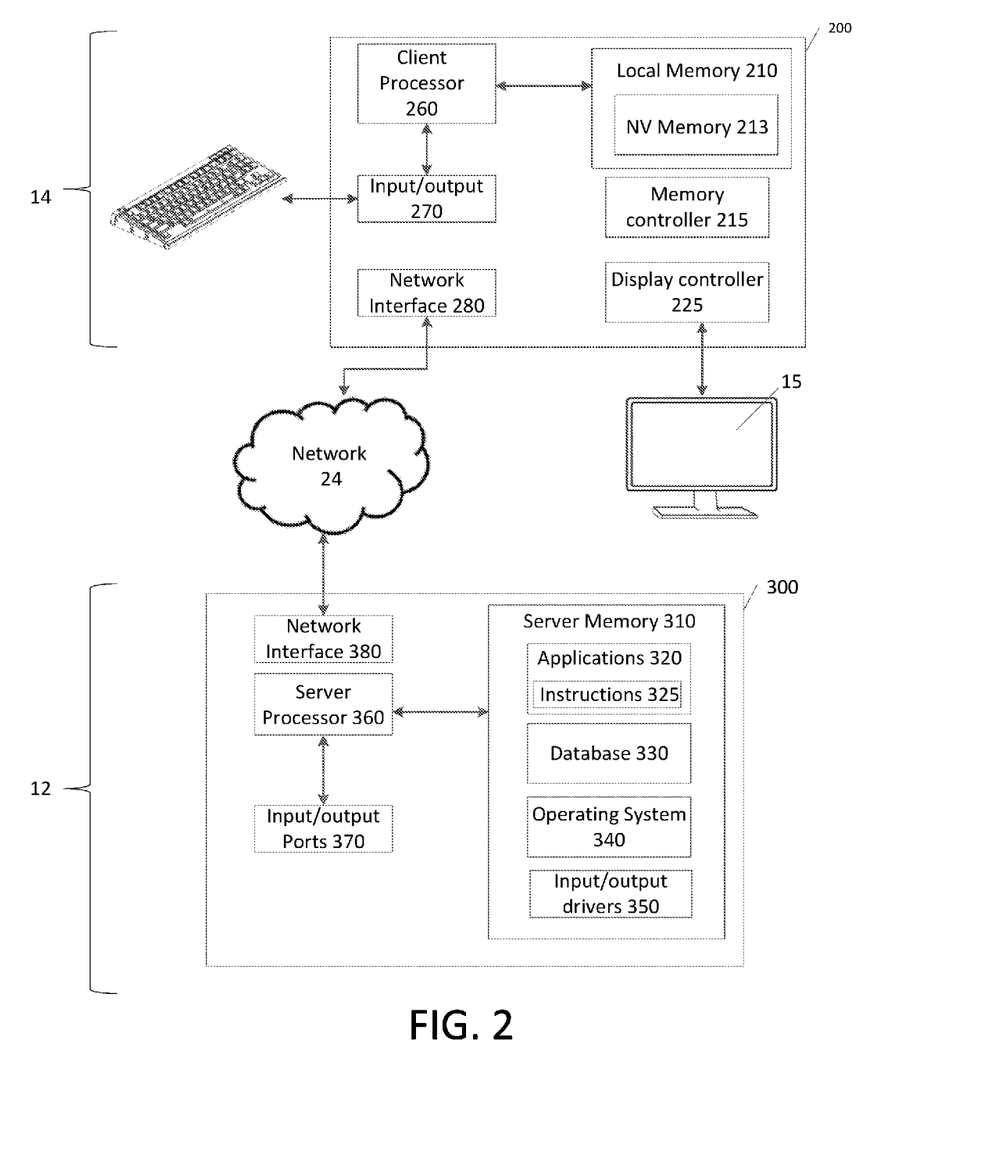
FIG. 2 is a block diagram of a client device controller and a server controller including input and output interfaces of the GIS of FIG. 1.

FIG. 2 illustrates a client controller 200, which may be an adjustable hardware apparatus such as a programmable logic controller (PLC). The client controller 200 may be developed through the use of code libraries, static analysis tools, software, hardware, firmware, or the like.

The client controller 200 includes a local memory 210. The local memory 210 can interface with several categories of hardware, firmware, software and data, including, applications, a database, an operating system (OS), and I/O device drivers.

The local memory 210 can include volatile memory such as, but not limited to, random access memory (RAM) such as dynamic RAM, static RAM, synchronous dynamic RAM, and the like. At least a portion of the local memory 210 is non-volatile memory 213 such as, but not limited to, read only memory (ROM) such as erasable programmable ROM, electronically erasable programmable ROM, programmable ROM, compact disc ROM, tapes, disks, and diskettes. The non-volatile memory 213 may be used to store and retrieve information were connection to the spatial server 12 is limited or not possible. For example, the non-volatile memory 213 is used to store tile images and other GIS data that need to be retrieved when the client device 14 is not in communication with the spatial server 12.

The non-volatile memory 213 has a predefined capacity for storage, although those skilled in the art will recognize that capacity can be reallocated or expanded to yield a new predefined capacity. Until the predefined capacity for storage is reached, and perhaps selected to maintain frequently-used GIS data, GIS data requested and retrieved from the spatial server 12 may be stored to the non-volatile memory 213. However, when the predefined capacity for storage has been reached, one or more previously-stored map images are removed from the local storage non-volatile memory 213 to create space to store newly requested GIS data.

The processor 260 is a hardware or firmware device for executing instructions in programs or software applications, particularly those stored in memory 210. In operation, the processor 260 is configured to execute software stored within the memory 210, communicate data to and from the memory 210, and generally control operations of the client device 14 pursuant to the software.

The I/O interface 270 allows entry of commands and information into the controller 200 via an input device associated with the client device 14. Examples of such input devices include, but are not limited to, a keyboard, a touchpad, a touchscreen, a microphone and voice controller, a pointing device (e.g., a mouse), a microphone, a joystick, a scanner, tactile input devices such as gloves and other body coverings, body movement, and the like.

In some embodiments, the client device controller 200 may additionally include a memory controller 215 and a display controller 225. The memory controller 215 manages the storage, indexing and retrieval of standardized identifiers and corresponding GIS data (e.g., images) in the non-volatile memory 213. In some instances described in association with FIG. 3, the memory controller 215 may also remove standard identifiers and corresponding GIS data. Such instances may include providing sufficient space to store a recently-retrieved standard identifier and corresponding GIS data, or maintaining the recently-retrieved and version-control of stored GIS data. When the standard identifiers and their corresponding images are retrieved the non-volatile memory 213 or the spatial server 12 in some instances, the display controller 225 interprets the standardized identifier as the corresponding image and sends the image the client display device 14.

In some embodiments, the controller 200 further includes a network interface 280 for coupling to the network 24, described below.

Referring back to FIG. 1, in some embodiments, the client devices 14 communicate using a GIS client application 16, which can be controlled in part by a human user via a graphical user interface (GUI) or a by another software or firmware application. The GIS client 16 is a distributed information system, comprising a GIS server (e.g., central processor) and a client such as, but not limited to, a web browser, desktop application, or mobile application. In its simplest form, GIS client 16 can be defined as any GIS that uses web technology to communicate between a server and a client. As illustrated in FIG. 1, the plurality of GIS clients 16 may connect to the spatial server 12 by way of the network 24.

In certain embodiments, the GIS client 16 may engage with the system 10 via an interface, such as the client display 15 (e.g., a monitor, and LCD, or a projector), speakers (not shown) or any other input/output device that facilitates interaction by a user of the GIS client 16. In this way, the display 15 presents graphical, textual, animation, audio, tactile, or other information from the GIS client 16. The GIS client 16 may manually or automatically manipulate the information displayed by the user interface. For example, the GIS client 16 may input a variety of navigational and search actions into the system 10. More specifically, the GIS client 16 may pan, zoom, or otherwise change the field of vision on the map, or the client 16 may search for a specific object or location, "jump to" a specific object or location by making a selection from a list, or be linked directly to a specific object or location. To access a previous map view, traditional navigational buttons, such as "forward" and "back" may be employed.

In some embodiment, the client devices 14 execute a web browser and/or a client software application, over a network 24, such as the Internet and/or an intranet. In these embodiments, the client devices 14 can send image requests to the spatial server 12 over the network 24.

The network 24 can be an IP-based network for communication between the client devices 14 and an external server, client, and the like via a broadband connection for example. The network 24 transmits and receives data between each client device 14 and external systems. Client devices 14 may be interconnected to the network 24 through many interfaces including a network, such as a LAN, a wide area network (WAN), dial-in-connections, cable modems, wireless modems, and/or special high-speed Integrated Services Digital Network (ISDN) lines.

The network 24 may be implemented in a wireless fashion, e.g., using wireless protocols and technologies, such as WiFi, among others. The network 24 may be a fixed wireless network, a wireless local area network (LAN), a wireless wide area network (WAN) a personal area network (PAN), a virtual private network (VPN), intranet or other suitable network system and includes equipment for receiving and transmitting signals.

The spatial server 12 stores data, image data or otherwise, to display on the client device 14 using tile images, vector graphics, and the like.

FIG. 2 also includes a functional block diagram of a server controller 300 including a server memory 310 having any one or combination of volatile memory and/or non-volatile memory. The server memory 310 is configured to contain information, such as, but not limited to, information relating to one or more areas of interest (e.g., address or coordinates) of the GIS client 16 and executable computer instructions. Additionally, the server memory 310 can include several categories of software and data, including, applications 320, a database 330, an operating system (OS) 340, and I/O device drivers 350.

The server memory 310 may include applications 320 for various programs, such as a caching sequence 400 (shown in FIG. 3) described below that, when executed, at least in part, by the server processor 360, process data received by the GIS 10. In operation, the client device 14 transmits an image request to the spatial server 12. The spatial server 12 then applies a hash function to the image request to generate a standardized identifier for transmission to the client device 14.

Once the standardized identifier is received from the spatial server 12, the client device cross-references the standardized identifier against a set of stored identifiers that resides in a memory associated with the client device, and if present, retrieves at least one stored tile image associated with the stored identifier from the local memory 210 of the client device 14.

If the standardized identifier supplied by spatial server 12 is not present in the memory of the client device 14, the client device 14 prepares to retrieve from the spatial server 12 the GIS data associated with the standardized identifier. Additionally, and preferably either simultaneously or sequentially, the client device 14 may determine and select a previously-stored image to remove from the client device 14. Additional details of the operation of the caching sequence 300 are described in association with FIG. 3.

The applications 320 can be stored in the server memory 310 and/or in a firmware (not shown in detail) as executable instructions and can be executed, at least in part, by the server processor 360. The applications 320 include various programs that when executed by the server processor 360, process data received by the GIS 10. The applications 320 may include a source program, executable program (object code), script, or any other entity comprising a set of instructions to be performed. Additionally or alternately, the applications 320 can be written as an object oriented programming language having classes of data or as a procedure programming language having routines, subroutines, and/or functions.

The applications 320 may be applied to data stored in the database 330, along with data, e.g., received via the I/O interface 270. The database 330 represents the static and dynamic data used by the applications 320, the OS 340, the I/O device drivers 350 and other software programs that may reside in the server memory 310.

The OS 340 controls the execution of other computer programs, such the GIS data graphical comparison systems and methods as described herein, and provides scheduling, input-output control, file and data management, memory management, and communication control and related services. As will be appreciated by those skilled in the art, the OS 340 may be any operating system for use with a data processing system.

The I/O device drivers 350 may include various routines accessed through the OS 340 by the applications 320 to communicate with devices and memory components. Finally, the I/O drivers 350 may further couple to devices, such as, but not limited to, network interface cards (NIC), modulators, demodulators, transceivers, and the like.

In some embodiments, the server memory 310 may incorporate electronic, magnetic, optical, and/or other types of storage media. In some embodiments, the server memory 310 can have a distributed architecture, where various components are situated remotely from one another, but can be accessed by the server processor 360.

The server processor 360 is a hardware device for executing software such as, but not limited to, the applications 320 stored in server memory 310.

The server processor 360 could be multiple processors, which could include distributed processors or parallel processors in a single machine or multiple machines. The server processor 360 can be used in supporting a virtual processing environment. The server processor 360 may be a microcontroller, microprocessor, application specific integrated circuit (ASIC), programmable logic controller (PLC), complex programmable logic device (CPLD), programmable gate array (PGA) including a Field PGA, or the like. References herein to processor executing code or instructions to perform operations, acts, tasks, functions, steps, or the like, could include the server processor 360 performing the operations directly and/or facilitating, directing, or cooperating with another device or component to perform the operations.

The I/O ports 370 allow the client device 14 to enter commands and information into the controller 300 via an input device. Examples of such input devices include, but are not limited to, a keyboard, a pointing device (e.g., a mouse), a microphone, a joystick, a scanner, tactile input devices such as gloves and other body coverings, body movement, and the like.

A network interface 380 couples the spatial server 12 to the network 24.

While the client memory 210 and server memory 310 are illustrated as being collocated with the respective client processor 260 and server processor 360, it should be understood that at least a portion of the client memory 210 and server memory 310 can include or consist of an indirectly (e.g., near field) accessed or remotely accessed storage system, for example, in conjunction with a server on a communication network, a remote hard disk drive, a removable storage medium, combinations thereof, and the like. Thus, any of the data, applications, and/or software described herein can be stored within the memory 210, 310 and/or accessed via network connections to other data processing systems (not shown) that may include a BLUETOOTH network, local area network (LAN), a metropolitan area network (MAN), or a wide area network (WAN), for example.

It should be understood that FIGS. 1 and 2 and the respective descriptions above are intended to provide a brief, general description of a suitable environment in which the various aspects of some embodiments of the present disclosure can be implemented. While the description refers to computer-readable instructions, embodiments of the present disclosure can also be implemented in combination with other program modules and/or as a combination of hardware and software in addition to, or instead of, computer readable instructions.

The spatial server 12 may functionally interface with one or more databases to store geospatial information and/or provide for a variety of functions, such as but not limited to publishing maps, sharing maps, providing for web services, providing for spatial analysis (e.g., vector, raster, network, and/or 3D analysis), providing for geographic display of conflicts and conflict resolution, delivering development tools and tool support, transforming between coordinate systems, and managing versioned data stores.

The spatial server 12 may connect to a version managed data store (VMDS) 18, a spatial relational database 20, and other files or databases 22, collectively databases. The databases 18, 20, and 22 may include geospatial information such as, but not limited to, areas of interest, weather conditions related to the areas of interest, and/or terrain data related to the areas of interest.

The VMDS 18 may store and analyze the spatial and topological networks that the GIS clients 16 may utilize. The VMDS 18 may include a variety of relational database features, such as attribute querying, join fields, triggers, and calculated fields. In addition, VMDS 18 has numerous spatial and topological capabilities, which may allow data such as points, texts, polylines, polygons, and raster data to be stored and analyzed. In the VMDS 18, spatial and attribute data are stored in data blocks, which reside in data store files on the server. When the GIS client 16 requests data, the VMDS 18 may determine a more optimum set of data blocks that are required, and then returns the data to the client 16 via the network for processing. Spatial functions of the VMDS 18 may include finding all features within a polygon, calculating Voronoi polygons of a set of sites, and performing cluster analysis on a set of points. Vector spatial data such as points, polylines, and polygons can be given topological attributes that allow networks to be modeled. All VMDS 18 data is presented as objects.

In some embodiments, the VMDS 18 is optimized to store and query data that is related to objects in space, including points, lines, and polygons. The database may use spatial indices to find values for spatial queries. Query types such as spatial measurements (e.g., finding the distance between points and determining polygon area), spatial functions (e.g., modifying existing features to create new ones), spatial predicates (e.g., allowing true/false queries), constructor functions (e.g., creating new feature by specifying the vertices that can make up lines), and observer functions (e.g., queries that return specific information about a feature) may all be operations supported by the VMDS 18.

The spatial relational database 20 is an integrated set of functions and procedures that enables spatial data to be stored, accessed, and/or analyzed more quickly and efficiently in a database, such as the spatial server 12. The spatial relational database 20 may provide structured query language (SQL) and functions that facilitate storage, retrieval, update, and query of collections of spatial features in a relational database. The database 20 may include components such as, but not limited to, a schema that prescribes storage, syntax, and semantics of supported geometric data types; a spatial indexing mechanism; a set of operators and functions for performing area-of-interest queries, spatial join queries, and other spatial analysis operations; and administrative utilities.

Figure 3:
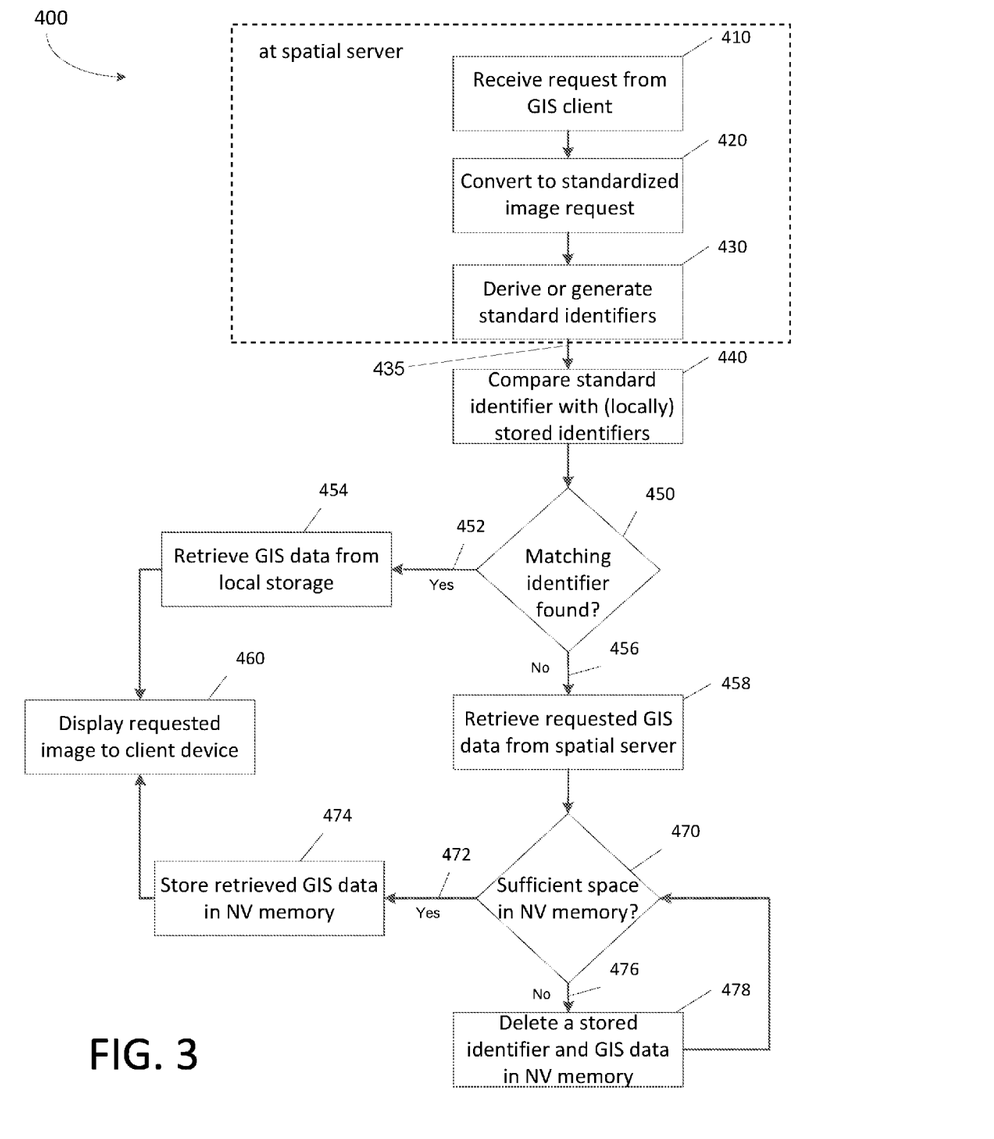
FIG. 3 is a flowchart illustrating an exemplary cache sequence of the controller of FIG. 2.

FIG. 3 is a flowchart illustrating an embodiment of a caching sequence 400 suitable for collecting, managing, storing, and displaying all forms of geographically referenced information. During execution of the caching sequence 400, the spatial server 12 receives an image request from a GIS client 16 associated with the client device 14, applies a hash function to the image request to generate at least one standardized identifier each for an element or elements of the requested data, transmits each standardized identifier to the GIS client 16, and if necessary, compares the standardized identifier to a stored identifier accessible by the spatial server 12 to retrieves at least one stored image associated with the stored identifier for transmission to, and display and storage on the client device 14 by the GIS client 16, which determines whether any previously-stored image needs to be removed from the client device 14 in order to accommodate the requested image.

First, at action 410, the server processor 360 of the spatial server 12 receives an image request from the client device 14. Specifically, the GIS client 16 sends the image request via the network 24 to the spatial server 12 for GIS data associated with a requested image. The request may be sent to the spatial server 12 in any number of forms, such as an address, coordinates, landmark, dropped pin and surrounds, grid identifier, and the like. For example, the client device 14 may enter a physical address which may be converted (e.g., by geocoding) into geographic coordinates.

As is known in the art, the request may consist of, as a non-limiting example, coordinates of a grid that defines a map image consisting of a mosaic of tile images, preferences as to format of the map image such as daytime vs. nighttime view and standard vs. satellite view, type or nature of landmarks, assets or other objects to be emphasized, zoom level, language, color scheme, language, fonts, and the like. The standardized identifier may be an encoded reference to all or some of the elements of such a request.

In some embodiments, the image request is then reformatted to a standardized image request, as seen at action 420. Reformatting the image request to a standardized image request involves resolving various types of requests into a uniform format that the spatial server 12 can uniformly process to determine or apply an appropriate standardized identifier for each data element that would be responsive to the request. The spatial server can include a table or other data store to reference in order to make conversion. The table or data store may, for example, be stored in the server memory 310 of the server controller 300 or may be otherwise accessible by the server processor 360.

At action 430, the server processor 360 processes the image request or a standardized image request to derive or generate one or more standard identifiers each identifying at least one data element, such as a tile image or an attribute of the requested data, based on the nature or content of the map request, such as, but not limited to, size of the image request, language of the image request, and coordinates of the image request.

The image request or standardized image request may derive each standard identifier by applying a hash function to the standardized image request based on the GIS properties of the requested image specified in the image request. The hash function can be applied to all or a portion of the image request.

Any function suitable for performing a one-way or two-way transform on components of an image request or can be used, although a hash function will be described. The hash function generates the standardized identifier for each element of requested data (e.g., the image) having an arbitrary size (e.g., 256×256 pixels) to digital data of fixed size, by generating a value known as a hash code, or hash key. Stated another way, the hash key is a standardized identifier used to index a requested data element (e.g., the image) to data elements stored in the spatial server 12 and in local non-volatile memory 213. The standard identifier can be a predetermined identifier that is used to identify a specific image stored in the spatial server 12. For example, a standard identifier can correspond to a specific tile image or group of tile images located on the spatial server 12 or previously stored by the GIS client 16.

Each standardized identifier generated by the hash function may identify various types of data indicated by the image, including GIS asset type, location, install date, Global Positioning System (GPS) coordinates, and asset identification and annotation information. For instance, the request may request a rendering of a map image that shows the location of all utility devices of the type "transformer" that are located within a certain geographic grid area. As such, a standardized identifier may actually correspond to one or more components of a map layer, to or to some or all discrete elements of GIS data, such as the elements of a tile image.

At 435, the spatial server 12 transmits or otherwise communicates the standard identifier to the client device 14.

At action 440, after receipt of one or more standard identifiers, the GIS client 16 compares each standardized identifier or a set or range of standardized identifiers to one or more identifiers stored on the non-volatile memory 213 of the client device 14. Each stored identifier also corresponds to a stored image, group of images or other GIS data stored that previously has been stored in the non-volatile memory 213.

At action 450, the client processor 260 determines whether the requested data identified by a standardized identifier has been cached in the local memory 210 on the client device 14. Specifically, the client processor 260 queries or otherwise cross-references the standardized identifier against the stored identifiers to determine whether a stored identifier corresponding to an image or group of images has been previously-stored in the non-volatile memory 213 matches the standardized identifier.

Where the client processor 260 finds that a standardized identifier received from the spatial server 12 does match a stored identifier within the non-volatile memory 213, cached data has been located. At 452, the method optionally includes a determination of whether the cached data should be replaced nonetheless, as will be described below. The method then proceeds to action 454. At action 454, the client processor 260, memory controller 215 and a display controller 225 of the client device 14 cooperate to retrieve and load the requested image and associated GIS data from the non-volatile memory 213 to the client device display at action 460. The display controller 225 interprets GIS data that corresponds to the standardized identifier and renders the requested image and associated GIS data for visual, textual, audible or other access via the client display device 14 and any other output devices.

Where the standardized identifier does not match a stored identifier within the non-volatile memory 213 (e.g., path 456), at action 458, the client processor 260 generates and communicates a response to the spatial server 12 to initiate retrieval of the requested GIS data from the spatial server 12. Upon receiving the response from the client device 14, the server processor 360 accesses the requested data in the databases 18, 20, and 22. Similar to searching the non-volatile memory 213, the requested image data is found by locating the standardized identifiers in the databases 18, 20, and 22. The server processor 360 initiates transmission of the requested image data to the GIS client 16 associated with the client device 14.

Once the requested data is received from the spatial server 12, some or all of the requested image data then may be stored to the non-volatile memory 213 for future requests associated with the same standard identifiers. For example, the requested image is stored to the non-volatile memory 213 for use by the client device 14 where the client device 14 has lost connection with the network 24.

At action 470, the client processor 260 determines if sufficient memory exists in the non-volatile memory 213 to store the image data corresponding to the requested image that was retrieved from the databases 18, 20, and 22 in communication with the spatial sever 12.

Where sufficient space exists within the non-volatile memory 213 (e.g., path 472), the image data that correspond to the standardized identifiers received from the spatial server are stored to the non-volatile memory 213, at action 474, for future retrieval.

Once stored, the requested image is rendered on the client device 14, via the GIS client 16, where present. The display controller 225 interprets the standardized identifiers to access image data associated with the requested image and renders the requested image and associated GIS data to the client display 15 at action 460.

Where the sufficient space does not exists within the non-volatile memory 213 (e.g., path 476), one or more identifiers stored within the non-volatile memory 213 are selected for removal of the stored identifier and the associated GIS data to create space for the requested image data, at action 478. In such a case, the memory controller 215 removes the stored identifier and some or all corresponding GIS data (e.g., the images and asset data) from the non-volatile memory 213.

Selection and removal of the stored identifier and corresponding GIS data may be accomplished in various different ways, each in accordance with the present disclosure.

In certain embodiments, each stored identifier has been associated with a timestamp or other sequence of characters or encoded information identifying when the image data associated with the stored identifier was created anywhere, or when it was stored, last accessed, first accessed, or repeatedly accessed by the GIS client 16. The stored identifier and associated GIS data may be removed to make space depending on any suitable calculation that references this timestamp. For example, removal may depend upon the client processor 260 determining a length of time the identifier and GIS data have been present in the non-volatile memory 213 or the frequency of use since being present in the non-volatile memory.

Where a stored identifier/GIS data is removed based on a predetermined length of time, time stamp information included in embedded or otherwise metadata may be used to approximately determine when the stored identifier/GIS data were initially stored to the non-volatile memory 213. For example, the stored identifier having a time stamp in furthest in the past may be removed from the non-volatile memory 213 along with corresponding image data.

Additionally or alternately, a length of time may be determined by position of the stored identifiers position within an index stack in the non-volatile memory 213. For example, where a first position within the index stack denotes an entry that is oldest in time, the stored identifier in the first position may be removed along with corresponding image data.

In addition to length of time, the stored identifier associated with GIS data that is to be deleted may alternately or additionally be determined based on frequency of use of the identifier since while it has been stored in the non-volatile memory 213.

Frequency of usage may also be in relation to the length of time the identifier has been stored. For example, where an identifier has been stored for one hour and has the least frequent number of request for retrieval amongst the other stored identifier in the non-volatile memory, the stored identifier and corresponding image data may not be deleted. However, where the same identifier has been stored for one month and has the least frequent number of requests, the stored identifier and corresponding image data may be removed from the non-volatile memory 213.

Where frequency of usage and length of storage time are both used in determining if a stored identifier/GIS data is removed from the non-volatile memory 213, a predetermined standard of comparing each metric may be established such as, but not limited to, ratio thresholds and conditional programming language. For example, a conditional programming statement such as an "if, then" statement may establish "if a stored identifier has a time stamp that is less than one day old, then the frequency of use is not considered." As another example, a ratio of time stored (measured in days) when compared to request frequency (measured in number of requests) may be 10:1 or any other predetermined number. Therefore, a stored identifier must have at least one request for retrieval from the non-volatile memory 213 for every ten days.

The client processor 260 may also reference a predefined threshold value in determining whether the GIS data is outdated, infrequently used (e.g., the oldest GIS data present in non-volatile memory 213), or otherwise temporally undesirable. The determination may identify for removal previously stored GIS data that is unused or infrequently used from remaining in the non-volatile memory. In this fashion, memory resources are allocated preferentially to GIS data that is the most useful the GIS client 16.

Other attributes of the stored GIS data, including version, size, age, and relative age as compared to other stored GIS data may be used to make the determination of which stored GIS is to be deleted. For any such attribute, attribute data may be maintained with or added to the stored identifier or the standardized identifier, and the attribute data may be compared or otherwise analyzed at the server level or client level, including but not limited to, by testing the attribute data against predefined thresholds, benchmarks, or rules-based logic.

In other embodiments, each stored identifier has been associated with a stored version identifier or other sequence of characters or encoded information that can be used to compare the iteration of the image data associated with the stored identifier. In these embodiments, when the spatial server 12 transmits the standardized identifier, it also provides a transmitted version identifier retrieved from the VMDS 18. The transmitted version identifier is compared with the stored version identifier associated with the corresponding stored identifier. The stored identifier and associated GIS data may be removed to make space depending on whether the transmitted version identifier indicates the version of the GIS data that can be provided is more recent than the version of the stored GIS data. Removal may be declined if the difference in versions does not surpass a predefined threshold, to prevent replacement of GIS data based on insignificant differences in version, for example. In this fashion, the stored image data is kept up to date, as memory resources are being maintained.

The process of determining sufficient capacity in the non-volatile memory 213 at action 470 and removing the stored identifier and corresponding GIS data from the non-volatile memory 213 at action 478 may be repeated until there sufficient capacity exists in the non-volatile memory 213 to store the standard identifier and corresponding GIS data (e.g., requested image).

Those skilled in the art will readily appreciate that any number of rules may be established to determine which stored GIS data should be maintained and which should be removed to optimize allocation of local memory resources. The stored GIS data also may be grouped into "extracts" or otherwise indexed collectively by the GIS client 16. In a sense, the client processor 260 acts as a controller for a local cache server. Alternatively, the cache server functionality may reside elsewhere, such as at another device in the network 24, including at a device to which the client device 14 is communicatively, or at the server 12. In any event, the client device 14 manages its memory resources using systems and methods consistent with this disclosure.

In certain circumstances, the GIS client 16 may determine that connectivity is not conducive to efficient retrieval of GIS data. In some instances, there may be in fact, no connectivity. The GIS client 16 may have the capability to determine whether the requested GIS data is stored in the local memory 210 without downloading any data whatsoever. Alternatively, in other instances, there may some connectivity but it may be insufficient to easily or efficiently retrieve the GIS data. In these instances, the GIS client 16 may transmit the request, receive the standardized identifier, and attribute data that indicates that the stored identifier and associated stored GIS data should be retrieved from the spatial server 12 and replaced, but may use the stored GIS data nonetheless, e.g., to avoid delay in rendering a map image. In such circumstances, the GIS client 16 may defer the determination of whether to retrieve and cache the GIS data to a time when the connectivity improves.

In certain circumstances, the GIS client 16 may be associated with a predefined area of interest, such as a frequently traversed geography. For instance, the GIS client 16 may be used by a client device 14 that operates in a given service area. Any or all of the rules and analysis performed by the GIS client 16 may be adjusted when a request is directed GIS data associated with the predefined area of interest, for example, such that replacement of data is accelerated to ensure that the predefined area of interest is maintained at the optimal level of accuracy, when a lower level of accuracy may be acceptable for other areas. In addition, the determination of whether to remove and replace previously-stored GIS data may be adjusted to favor allocating storage for GIS data associated with the predefined area of interest.

Aspects of the present invention are described with reference to flowchart illustrations and/or block diagrams of methods, apparatus (systems) and computer program products according to embodiments of the invention. It will be understood that each action of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A geographic information system (GIS) client device, comprising:
    a client processor;
    a local memory adapted to store GIS data;
    a computer-readable medium upon which are stored instructions that, when executed by the client processor, cause the GIS client device to:
        generate a request for GIS data and transmit the request to a spatial server;
        receive, from the spatial server, a standardized identifier that corresponds to at least some of the requested GIS data where,
            if the standardized identifier corresponds to a stored identifier in the local memory, determine whether to retrieve from the local memory GIS data that corresponds to one or both of the standardized and the stored identifier, and
            if the standardized identifier does not correspond to a stored identifier associated with a map client, retrieve from the spatial server GIS data that corresponds to one or both of the standardized and the stored identifier; and
        determine storage of the retrieved GIS data based on an available storage capacity of the local memory where,
            if the available storage capacity of the local memory is at least equal to a predefined capacity threshold, storing the retrieved GIS data to the local memory, and
            if the available storage capacity of the local memory is less than the predefined capacity threshold, removing at least one previously-stored standard identifiers based on a timestamp of when the stored identifier was stored to the local memory and replacing at least a portion of the previously-stored GIS data stored in the local memory with the GIS data retrieved from the spatial server, wherein the previously-stored GIS data is replaced based on size of the GIS data and frequency of access of the GIS data.

2. The GIS client device of claim 1, wherein the instructions further cause the GIS client device to determine whether to retrieve from the local memory previously-stored GIS data that corresponds to one or both of the standardized and the stored identifier by:
    determining whether the GIS client device has sufficient connectivity to the spatial server to access GIS data that can be transmitted by the spatial server.

3. The GIS client device of claim 2, wherein the GIS client device determines whether the GIS client device has sufficient connectivity to the spatial server before transmitting the request to the spatial server.

4. The GIS client device of claim 1, wherein the instructions further cause the GIS client device to determine whether to retrieve from the local memory previously-stored GIS data that corresponds to one or both of the standardized and the stored identifier by:
    determining at least one of the following: age of the previously-stored GIS data, relative age of the previously-stored GIS data, duration of storage of the previously-stored GIS data in the local memory, version of the previously-stored GIS data.

5. The GIS client device of claim 1, wherein the standardized identifier received from the spatial server corresponds to at least a section of a map image comprising a plurality of tile images.

6. The GIS client device of claim 1, wherein GIS data retrieved from the spatial server is removed, based upon at least one of the following: age of the stored GIS data, relative age of the stored GIS data, duration of storage of a stored map GIS in the local memory, and version of the stored GIS data.

7. The GIS client device of claim 6, wherein replacing GIS data previously stored in the local memory with the GIS data retrieved from the spatial server based upon age of the stored GIS data comprises comparing age data associated with the previously-stored GIS data with a predefined age threshold to select previously-stored GIS data for replacement with the retrieved GIS data.

8. The GIS client device of claim 6, wherein replacing GIS data previously stored in the local memory with the GIS data retrieved from the spatial server based upon relative age of the stored GIS data comprises comparing age data associated with the previously-stored GIS data to identify the oldest GIS data stored in the local memory.

9. The GIS client device of claim 6, wherein replacing GIS data previously stored in the local memory with the GIS data retrieved from the spatial server based upon duration of storage of the stored map GIS in the local memory comprises comparing a timestamp associated with the previously-stored GIS data and with a predefined duration threshold to select previously-stored GIS data for replacement with the retrieved GIS data.

10. The GIS client device of claim 6, wherein replacing GIS data previously stored in the local memory with the GIS data retrieved from the spatial server based upon version of the stored GIS data comprises determining whether the version of the previously-stored GIS data that corresponds to the stored identifier older by at least a predefined extent than the version of the GIS associated with the standardized identifier, and if so, selecting the previously-stored GIS data for replacement with the retrieved GIS data.

11. The GIS client device of claim 1, wherein replacing GIS data previously stored in the local memory with the GIS data retrieved from the spatial server based upon frequency of access of the stored GIS data comprises comparing frequency data associated with the previously-stored GIS data with a predefined frequency threshold to select previously-stored GIS data for replacement with the retrieved GIS data.

12. The GIS client device of claim 1, wherein the standardized identifier includes a hash code.

13. The GIS client device of claim 1, wherein the stored instructions, when executed by the client processor, further cause the GIS client device to generate the standardized identifier prior to transmitting the request to the spatial server, the request including the standardized identifier.

14. The GIS client device of claim 13, wherein the GIS client device generates the standardized identifier by applying a hash function to at least one element of the request.

15. A geographic information system (GIS) client device, comprising:
a client processor;
a local memory adapted to store GIS data;
a computer-readable medium upon which are stored instructions that, when executed by the client processor, cause the GIS client device to:
generate a request for GIS data;
transmit the request to a spatial server;
retrieve, from the spatial server, attribute data associated with at least some of the requested GIS data; and
based on the attribute data, determine storage of the retrieved GIS data based on an available storage capacity of the local memory where,
if the available storage capacity of the local memory is at least equal to a predefined capacity threshold, storing the retrieved GIS data to the local memory, and
if the available storage capacity of the local memory is less than the predefined capacity threshold, removing at least one previously-stored standard identifiers based on a timestamp of when the stored identifier was stored to the local memory and replacing at least a portion of the previously-stored GIS data stored in the local memory with the GIS data retrieved from the spatial server, wherein the previously-stored GIS data is replaced based on size of the GIS data and frequency of use of the GIS data.

16. The GIS client device of claim 15, the request including a standardized identifier that corresponds to at least some of the requested GIS data.

17. The GIS client device of claim 16, wherein the GIS client device generates the standardized identifier by applying a hash function to at least one element of the request.

18. The GIS client device of claim 15, wherein the GIS data retrieved from the spatial server is removed, based upon at least one of the following: age of the stored GIS data, relative age of the stored GIS data, duration of storage of a stored map GIS in the local memory, and version of the stored GIS data.

19. The GIS client device of claim 15, wherein the instructions further cause the GIS client device to determine whether to retrieve the requested GIS data, based at least in part on the attribute data.

20. The GIS client device of claim 15, wherein the instructions further cause the GIS client device to determine whether to retrieve the requested GIS data, based at least in part on making a determination whether the GIS client device has sufficient connectivity to the spatial server.

* * * * *